Figure 1:
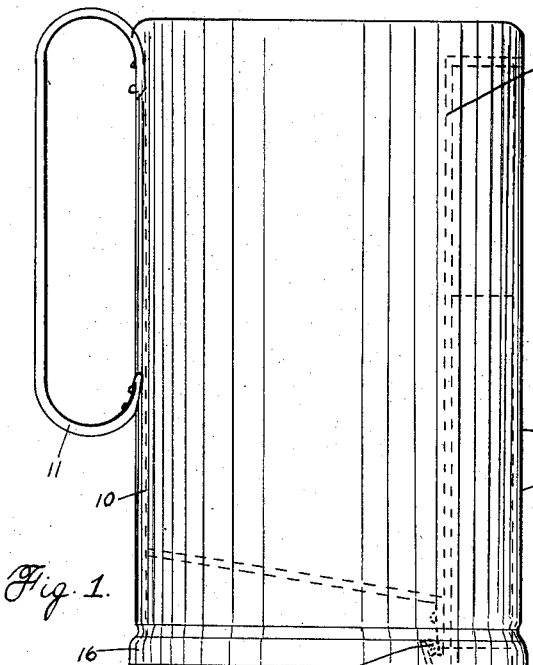

May 22, 1934.  W. T. FAUX  1,960,102

FLUID DISPENSING APPARATUS

Filed July 27, 1932

INVENTOR.

William T. Faux

Patented May 22, 1934

1,960,102

UNITED STATES PATENT OFFICE 1,960,102

FLUID DISPENSING APPARATUS

William T. Faux, Santa Barbara, Calif.

Application July 27, 1932, Serial No. 625,041

6 Claims. (Cl. 221—27)

This invention relates to improvements in dispensing apparatus for dispensing fluids and liquids such as oil and the like, and has for its main object to make an improvement over the device described and illustrated in an application filed by me on July 26th, 1930, bearing Serial Number 470,790.

One of the objects of the present invention is to provide a simple, efficient and inexpensive liquid dispenser wherein use is made of a can and a slidable discharge spout, and means are provided for preventing the dripping of the slidable discharge spout after it has been moved into service position.

A further object of the present invention is to provide an oil can or similar dispensing apparatus in which a vertically slidable valve spout is employed in the can, being movable to down projecting position below the can for discharging slowly the liquid contents of the can, and being moved upwardly so as to be enclosed within the can in closed position, means being provided for closing the outlet end of the spout after it has been restored to position within the can.

A still further object of this invention is to hingedly attach upon the lower projecting end or portion of the tubular casing in which the valve spout is telescopically mounted, a closure plate which closes both the lower open end of the tubular casing as well as that of the valve tube, to assure that there will be no dripping of oil either after the valve tube has been moved back into the can, or just as the tubular casing is about to be exposed with its outlet end open.

The device of the character described allows the operator to take hold of a handle, move it downwardly of the can, and position the lower end of the valve tube below the can, at which time the liquid contents of the can will automatically start to flow through both the tubular casing and the valve tube for the purpose of discharging same through the outlet end of the tube. When the tube is drawn back into the can the oil flows into the tubular valve and this valve tube is shut off automatically; and now there is the hazard that some of the liquid might or could drip off from the lower outlet end of the tube, to prevent which it is necessary to completely but yieldably close both the outlet end of the tubular casing as well as of the valve tube.

A final object thereof is to provide a closure for the lower outlet end of the tubular casing, which prevents any dripping of liquid therefrom when the can is not in use, and above which the lower end of the valve tube is located when the latter is in enclosed position within the casing. In this manner the tube when moved downwardly into liquid discharging position presses the closure open automatically and keeps it open as long as it projects below the tubular casing, thus allowing the contents of the can to be slowly drained out through this valve tube. When the valve tube is drawn inwardly into the can it will ba assured that the closure automatically returns immediately to its tube closing position.

With the above and other objects in view my invention consists in the combination, arrangement and details of construction disclosed in the drawing and specification, and then more particularly pointed out in the appended claims.

Figure 2:
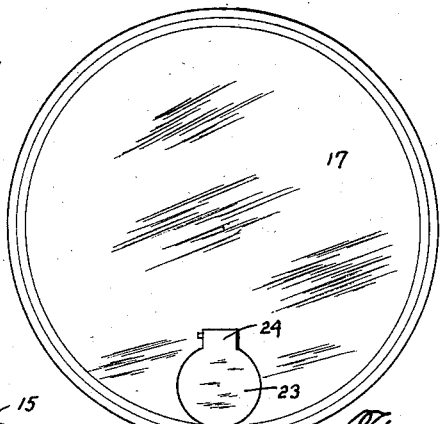
Figure 3:
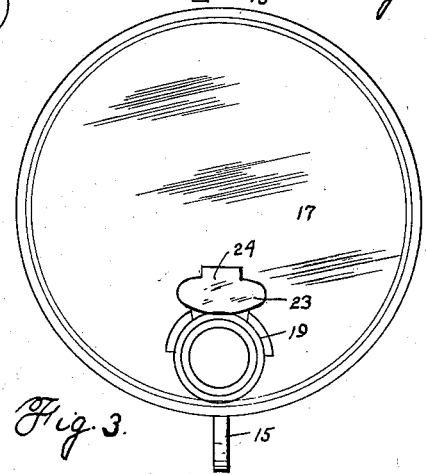
Figure 4:
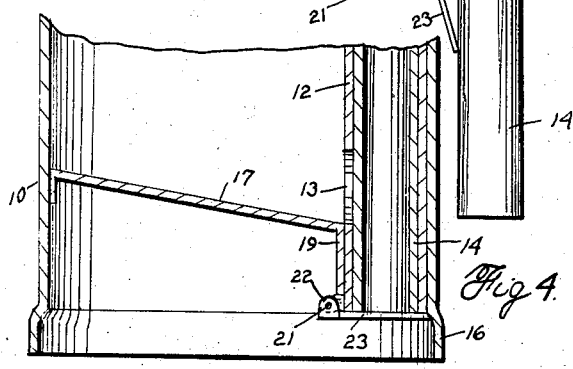
Figure 6:
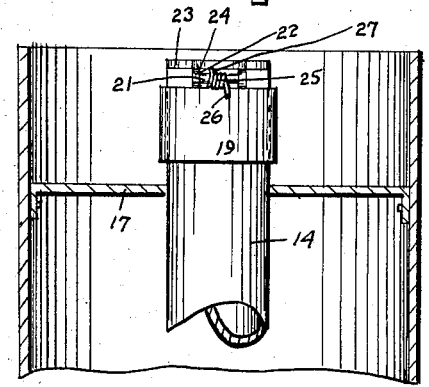
Figure 5:
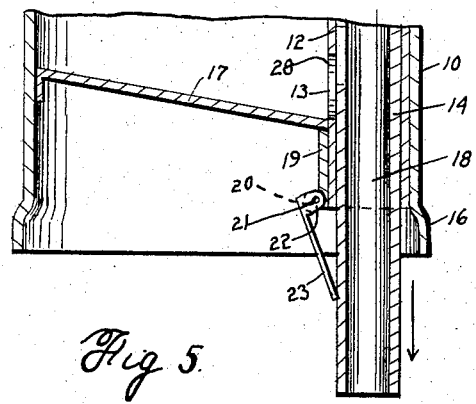
Figure 7:
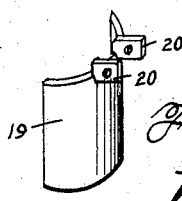

In the drawing, wherein similar reference characters designate similar reference parts wherein found, Figure 1 is a side elevation of my invention showing the valve tube in contents discharging position with the closure plate open, Figure 2 is a bottom plan view of the can, showing the closure plate in closed position, Figure 3 is another bottom plan view of the can, showing the closure plate open in the act of projecting the valve tube to open position, Figure 4 is a vertical sectional elevation of the oil can showing the valve tube in closed position and the closure plate closing its discharge end, Figure 5 is a view similar to Figure 4 but showing the valve tube in open position, the closure plate being also open, Figure 6 is a fragmental sectional detail view of the oil can showing the tubular casing and the manner of mounting hingedly thereupon the closure plate, and Figure 7 is a perspective view of an arcuate plate attachable to the tubular casing and carrying the hinge lugs for the closure plate to be pivoted on.

Reference being made to the drawing, the liquid or fluid or oil containing can is designated 10, which carries the conventional handle 11 and which may have the bulging base portion 16. This type of oil dispensing can is constructed in identically similar manner to the invention disclosed in my co-pending patent application filed July 26th, 1930, bearing Serial Number 470,790, so the details of construction need not be amplified here.

The can 10 has a vertical tubular casing 12 extending from a point short of the upper end of the can, which is open, to a point substantially in back of the base portion thereof. The bottom of the oil can is inclined as at 17 and is spaced above the base portion 16 of the can and has an opening through which the tubular casing may project as shown in Figure 4, the outlet end of this casing being open. Slidably and telescopically fitted into the tubular casing 12 is the valve tube 14 having an operating handle 15 which slidably projects through a slot formed in the tubular casing as well as in the can itself, as it is apparent that when the handle 15 is taken hold of, the tube can be moved upwardly and downwardly of this can 10 to allow the lower portion of the valve tube 14 to project below the can and be seated entirely within the can, the lower outlet end of this tube 14 also being open. The parts so far described are all set forth in my co-pending application. It will also be observed that the tubular casing is formed with an inlet port 13 adjacent to the inclined bottom 17 of the can, and that the valve tube 14 also has a port 28, which is out of registration with the port 13 when the valve tube is mounted entirely within the can 10.

My present invention consists in closing the lower outlet ends of both the tubular casing 12 and the valve tube 14 by means of a yieldable hinged closure plate 23. I form an arcuate plate 19 with integral parallel spaced lugs 20, and I secure this plate 19 fixedly in overlying relation upon and against the lower portion of the tubular casing immediately below the inclined bottom 17 so that the outstanding lugs 20 face downwardly. I take the closure plate 23, which is flat and formed circular for its major portion and formed with a polygonal lip 24, and I position the lip 24 between the lugs 20 so that the hinge ears 22 of the closure plate register with the lugs 20 of the arcuate plate, and then I introduce a locking pin 21 into the lugs and ears of the respective arcuate plate and closure plate. The closure plate 23 is now hinged for pivotal movement upon the arcuate plate. I wind a coiled spring 25 around the pin, before its opposite ends have been inserted into the mentioned lugs and ears, and cause one finger 27 of this coiled spring to bear against the hinged closure plate 23, and cause the other finger 26 thereof to bear against the arcuate plate 19.

The spring 25 will cause he closure plate to close the outlet ends of the tubular casing 12 and the valve tube 14 so any oil present or clinging upon the inner wall of the tube 14 may not drip down the same and in the bore 18 thereof and out of the tube, even after the ports 13 and 28 of the tubular casing and valve tube are out of registration. When it is desired to open the tube 14 and allow the contents of the can to be drained slowly the operator takes hold of the handle 15, draws or slides the tube 14 downwardly as far as it will go, and then ports 13 and 28 are in communication so the liquid may flow therethrough and into the bore 18 of the tube and out of the bottom thereof, since by pushing the tube downwardly the hinged closure plate 23 is opened, against the tension of its spring 25, and is kept open as long as the lower portion of the tube occupies the position shown in Figure 5. After the tube 14 has been reinserted into the tubular casing 12, it will be seen that the spring 25 may and will press the closure plate 23 closed again against the lower ends of casing 12 and valve tube 14.

I do not mean to confine myself to the exact details of construction save as pointed out in the appended claims.

What I seek to secure by Letters Patent is:

1. In a device as described, the combination of a liquid dispensing can, an inclined bottom to said can spaced above the base portion thereof, a tubular casing projecting vertically coextensively with and in said can and below the inclined bottom thereof, but spaced above the base portion of the can, an arcuate plate secured in overlying relation upon the lower projecting end of the tubular casing, a pair of parallel outstanding lugs formed upon the plate and located at its bottom end, a valve tube sliding in said casing and being manually projectable below the casing to discharge the contents of the can, a closure plate having lugs hingedly mounted upon the lugs of the arcuate plate, and resilient means pressing the closure plate in closed relation to the outlet ends of the casing and of the valve tube when the latter is enclosed in the can, said tube when projected downwardly in said casing pressing the closure plate open.

2. In combination a dispensing can having an opening at its bottom, a valve tube slidably mounted so as to move through the opening to a position projecting below the bottom of the can, means for allowing draining of the can contents when the tube is caused to project in its last named position, means closing the lower outlet end of the valve tube automatically when the latter is moved entirely within the can, and resilient means engaging the other means to hold it closed against the tube but allowing the closing means to be opened when the tube presses against the latter.

3. In combination with a liquid dispensing can having an opening at its bottom and a base portion projecting below the opening, a valve tube slidably mounted in said opening and designed to be manually moved below the opening and the base portion of the can to allow for draining the contents of the can, and means pressing against the valve tube when it is in open position and automatically closing the lower end of the tube when the latter is reinserted into the can, to prevent dripping of the tube.

4. In combination a dispensing can consisting of a tubular casing, and a bottom projecting above the bottom edge of the casing, means secured to the lower projecting end of the casing and engaging the outlet end of the casing yieldably for closing the latter, a valve tube slidably mounted in said tubular casing and designed to project therebelow to allow for draining the contents of the can, and means whereby said closing means is pushed open when the tube moves to fully open position, and whereby when the tube is reinserted into the can the tube will be again closed automatically by the closing means.

5. In combination with an oil can having a bottom, a tubular casing arranged vertically therein and having an inlet port formed adjacent to the bottom of the can, a valve tube slidably mounted in said tubular casing for movement below the can and having a port designed to register with the other port for allowing oil to pass through both ports into said valve tube for pouring purposes, a spring pressed valve plate closing the lower open end of the tubular casing but pressed open in the act of lowering the tube to cause the latter to project below the tubular casing.

6. In combination with an oil can having a vertical tubular casing extending coextensively therewith and therein, a valve tube slidably and telescopically mounted therein, means for introducing oil into said tubular casing and into said valve tube for discharge purposes, means for moving said valve tube downwardly below the can, a closure for the lower open end of said casing for closing it, and also the open end of the tube, resilient means pressing said closure closed against the casing and manually controlled means for actuating said valve tube to project it against the closure to open the same and to project it below the can adjustably.

WILLIAM T. FAUX.